May 30, 1950 W. SHOCKLEY 2,509,889
DIFFERENTIAL ALTIMETER
Filed Jan. 13, 1948

INVENTOR
W. SHOCKLEY
BY
*G. H. Huydt*
ATTORNEY

Patented May 30, 1950

2,509,889

UNITED STATES PATENT OFFICE 2,509,889

DIFFERENTIAL ALTIMETER

William Shockley, Madison, N. J., assignor to Bell Telephone Laboratories, Incorporated, New York, N. Y., a corporation of New York Application January 13, 1948, Serial No. 1,949

1 Claim. (Cl. 73—179)

This invention relates to meters and more particularly to an altimeter for indicating whether or not an airplane is gaining or losing elevation and at what rate it is climbing or descending.

The object of the invention is to provide a simple, compact and relatively inexpensive meter capable of readily providing information as to the climb or descent of an airplane.

According to the present invention, a compact meter is obtained by providing a vessel having a narrow throat portion in which two thermally sensitive resistors with a heating coil between them are inserted in the throat of the vessel. A meter is connected to the resistors, and, when suitably calibrated, may be used for indicating the rate of climb or descent of an airplane.

While the invention will be described with reference to its application as an altimeter, it will be obvious that it may be employed for other purposes, as for example, in determining the direction and rate of flow of fluids.

In accordance with this invention, a vessel having a narrow throat portion is provided in which two thermally sensitive resistors and a heating coil between them are inserted in the throat of the vessel. The two resistors are connected in a Wheatstone bridge arrangement forming two adjacent arms of the bridge. Battery is applied to one diagonal of the bridge, and an indicating instrument is connected across the other diagonal. Changes in atmospheric pressure due to the climb or descent of an airplane produce air flow into and out of the throat of the vessel. The air flow carries the heat of the heating coil to one thermally sensitive resistor or to the other, depending upon the change of pressure, and thus changes the temperature of the thermally sensitive resistors. The difference in temperature of the thermally sensitive resistors is reflected by an unbalance in the Wheatstone bridge and is indicated by the meter which may be suitably calibrated to indicate the rate of climb or descent of the airplane.

Figure 1:
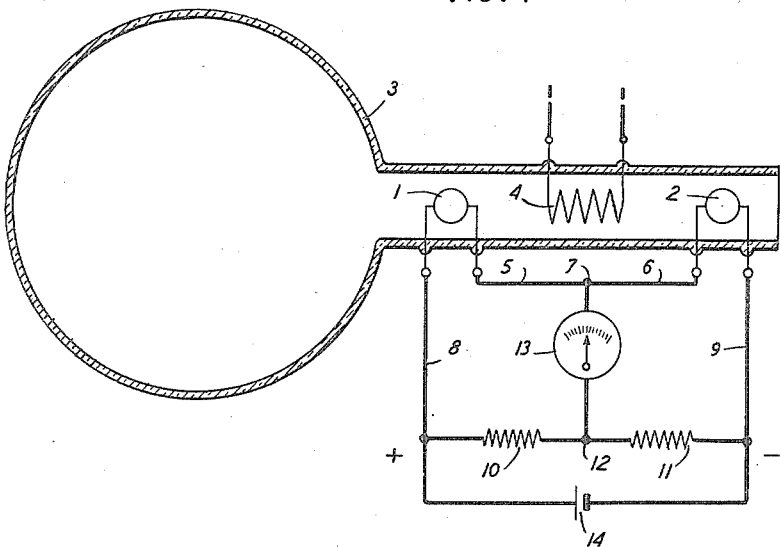
Figure 2:
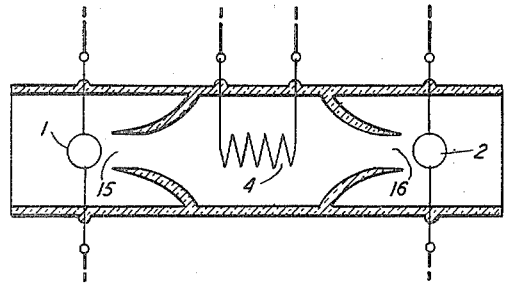

The novel features of the altimeter may be more readily understood by reference to the following description when read in connection with the accompanying drawings in which:

Fig. 1 is a view of a vessel showing the arrangement of the thermally sensitive resistors and the heating coil in the throat portion of the vessel and a schematic circuit of the electrical apparatus connected in a Wheatstone bridge; and Fig. 2 is a modification of the throat portion of the vessel.

Referring to Fig. 1, Thermistors 1 and 2, which may be of the type describd in Patent 2,258,646 to R. O. Grisdale, issued October 14, 1941 and assigned to the Bell Telephone Laboratories, Incorporated, are inserted in the throat of a vessel 3. Between the two Thermistors, a heating coil 4 is inserted on the same axial line with the Thermistors. The heating coil is supplied with suitable heating current from a source not shown.

Thermistors 1 and 2 are connected by conductors 5 and 6 to a junction point 7 and conductors 8 and 9 through resistors 10 and 11 to junction point 12. Connected across junction points 7 and 12 is a meter 13 with a center reading dial. A source of constant current is supplied by battery 14 to the Thermistors 1 and 2. The circuit as described forms a Wheatstone bridge.

Thermistors or thermally sensitive resistors are devices made of solids whose electrical resistance varies rapidly with temperature and are particularly suitable for the measurement of the thermal conduction of surrounding gases. Although Thermistors are shown as desirable in the practice of this invention, any type of thermally sensitive resistor with suitable characteristics for rapidly varying in resistivity upon changes of temperature may be used.

By means of the bridge circuit, some electrical energy from the battery 14 is dissipated in each Thermistor to heat it several degrees above the surrounding air. With no change of pressure, the bridge is in balance. Changes in atmospheric pressure due to the climb or descent of an airplane cause air to flow into or out of the vessel. This flow of air carries with it the heat of the heating coil and changes the dissipation of energy of the Thermistors due to the change in thermal conduction of the surrounding air. The change in dissipation of electrical energy in the Thermistors changes the temperature of the Thermistors and consequently the bridge becomes unbalanced. The unbalance current or voltage is indicated by the meter which is suitably calibrated to indicate the rate of climb or descent of an airplane.

In a preferred embodiment of the invention, the throat of the vessel is constructed with two narrow constrictions 15 and 16 adjacent to the Thermistors 1 and 2, respectively, as shown in Fig. 2. By means of these constrictions, the flow of heat from the heating coil will be concentrated on one Thermistor or the other, depending on which way the heated air is flowing, and thus the thermal sensitivity of the Thermistors will be increased.

What is claimed is:

An altimeter comprising a vessel and a conduit immediately attached thereto, said conduit providing inlet and outlet means for said vessel and having a uniform inside dimension throughout its length, two thermally sensitive resistors each having the characteristic of rapidly varying in resistivity with change of temperature axially mounted in said conduit, means in said conduit forming oppositely disposed nozzles between said resistors, each of said nozzles being adjacent and directed toward an individual resistor, a heating coil axially mounted in said conduit between said nozzles, said resistors being connected in a Wheatstone bridge circuit, current supply means for said bridge, and means connected to said bridge circuit to indicate the difference in temperature of said resistors as determined by the flow of heat from said heating coil through one of said nozzles to the resistor adjacent thereto or through the other of said nozzles to the resistor adjacent thereto in response to the flow of air into and out of said vessel due to changes in pressure.

WILLIAM SHOCKLEY.

REFERENCES CITED

The following references are of record in the file of this patent:

UNITED STATES PATENTS

| Number | Name | Date |
| --- | --- | --- |
| 1,769,358 | Pinkerton et al. | July 1, 1930 |
| 2,214,181 | Rylsky | Sept. 10, 1940 |